United States Patent [19]

Willan

[11] Patent Number: 5,239,292

[45] Date of Patent: Aug. 24, 1993

[54] COMPUTER GRAPHICS SYSTEM ELECTRONICALLY SIMULATING PAINTING ON CANVAS

[75] Inventor: Stephen B. Willan, London, England

[73] Assignee: Crosfield Electronics Ltd., England

[21] Appl. No.: 742,143

[22] Filed: Aug. 1, 1991

Related U.S. Application Data

[63] Continuation of Ser. No. 417,151, Oct. 4, 1989, abandoned.

[30] Foreign Application Priority Data

Oct. 4, 1988 [GB] United Kingdom ............... 8823286

[51] Int. Cl.$^5$ ............................................. G09G 5/00
[52] U.S. Cl. .................................... 340/709; 340/706
[58] Field of Search ............... 340/706, 709, 710, 708, 340/712, 794, 729; 364/521, 518; 395/129, 130, 143

[56] References Cited

U.S. PATENT DOCUMENTS

| | | | |
|---|---|---|---|
| 4,514,818 | 4/1985 | Walker | 364/521 |
| 4,563,740 | 1/1986 | Blake et al. | 340/709 |
| 4,734,685 | 3/1988 | Watanabe | 340/706 |
| 4,787,051 | 11/1988 | Olson | 364/518 |
| 4,875,033 | 10/1989 | Kato et al. | 340/709 |
| 4,908,791 | 3/1990 | Giorgio | 340/710 |

FOREIGN PATENT DOCUMENTS

WO85/05477 12/1988 PCT Int'l Appl. ................ 340/712
2140257 11/1984 United Kingdom .

OTHER PUBLICATIONS

IBM Technical Disclosure Bulletin, vol. 24, No. 4, Sep. 1981, "Digitizing Tablets for Area and Color", A. Appel et al.

Primary Examiner—Jeffery A. Brier
Attorney, Agent, or Firm—Sughrue, Mion, Zinn, Macpeak & Seas

[57] ABSTRACT

A graphics system comprises an input device, and a computer for detecting changes in the position of the input device relative to a surface, and a monitor (63) for displaying patterns which follow the movement of the input device. The computer calculates at least one differential derivative with respect to time of the input device position and controls characteristics of the display patterns in dependance upon the or each calculated derivative.

9 Claims, 6 Drawing Sheets

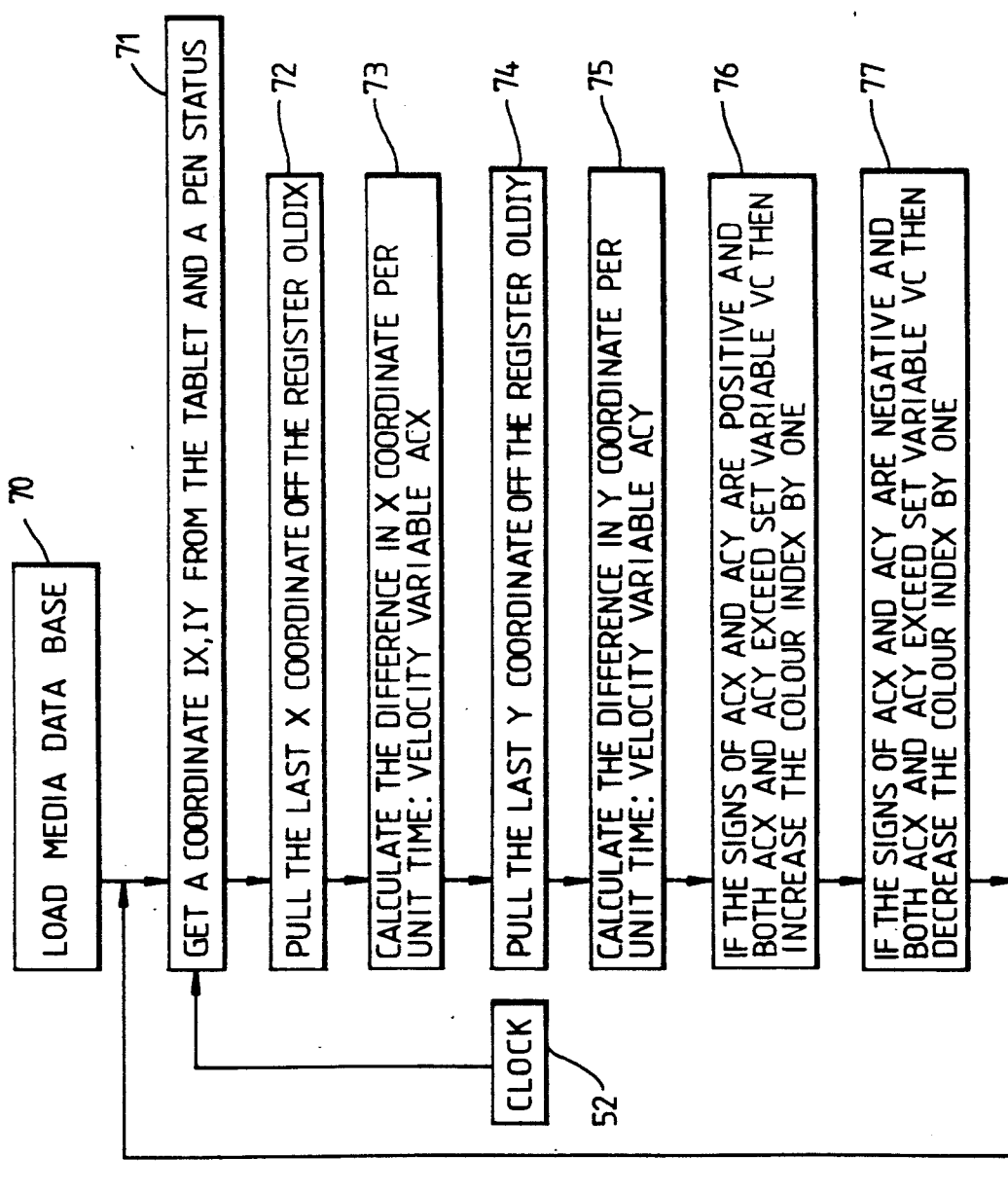

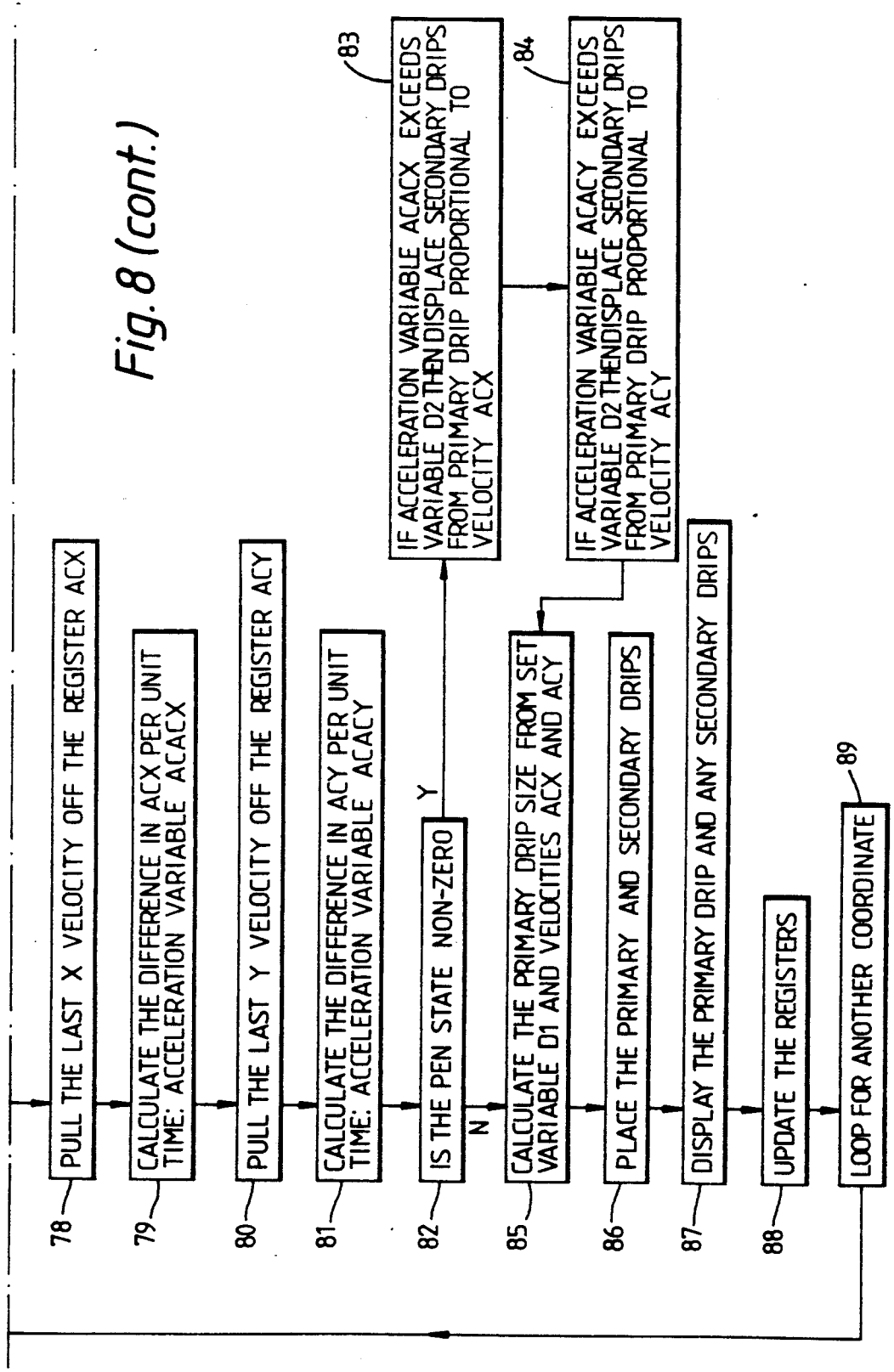

COMPUTER GRAPHICS SYSTEM ELECTRONICALLY SIMULATING PAINTING ON CANVAS

This is a continuation of application Ser. No. 07/417,151 filed Oct. 4, 1989, now abandoned.

FIELD OF THE INVENTION

The present invention relates to a graphics system.

DESCRIPTION OF THE PRIOR ART

Computer graphics systems are known which convert the movements of a pen-like input across a tablet into patterns on a screen, the patterns corresponding in shape to the movements of the input device relative to the tablet. Variations of this basic system are also known in which for example the input device is pressure sensitive such that the width of the pattern is a function of the applied pressure, or the input device is in the form of a "mouse" which is movable on a ball across a flat surface, rotations of the ball controlling the configuration of the resultant pattern.

Such systems must respond rapidly to movements of the input device if the user is to be able to exercise adequate control. If changes to the displayed image lagged significantly behind the movements of the input device causing those changes the user would lose the movement/image change visual feedback that is essential.

Systems are available which provide an adequate rate of response to input device movement but users still feel inhibited by the system characteristics which are considered not to adequately emulate the expressive qualities of images produced using traditional physical media. For example, the type of mark produced when painting with a soft brush is completely different from that produced when using pen and ink, and the "feel" of the different implements is very different. The ability of an artist to express himself or herself in the visual arts appears to be significantly affected by the behaviour of the media used. Available systems do not adequately emulate the dynamic behaviour of traditional media.

It is an object of the present invention to provide an improved computer graphics computer system which obviates or mitigates the problems outlined above.

SUMMARY OF THE INVENTION

According to one aspect of the present invention there is provided a graphics system comprising an input device, means for detecting changes in the position of the input device relative to a surface, and means for displaying patterns which follow the movement of the input device, wherein means are provided for determining at least one differential derivative with respect to time of the input device position, and means are provided for controlling characteristics of the displayed patterns in dependence upon the or each determined derivative.

The determined derivative may be velocity (first derivative), acceleration (second derivative) or higher order derivatives. The determined derivatives are then used to control for example the shape, width, density, texture and colour of the resultant visual effect.

Preferably, the velocity and acceleration of the input device are detected and used to control the displayed pattern. Inertial effects can also be simulated by considering the simulated mass of a component of an input device and its acceleration. Erratic or "jerky" movements can also be detected by monitoring the rate of change of the acceleration to enable the simulation of the results of such movements. Thus many of the characteristics which give traditional media a unique "feel" can be simulated.

Preferably, the input device provides three dimensional information, that is X and Y information corresponding to position on a surface and Z information corresponding to pressure or possibly vertical displacement of the input device. Scalar and vector quantities can then be calculated for one or more of the three dimensions corresponding to velocity, acceleration etc. to enable special visual effects to be achieved corresponding to those familiar to users of traditional media. For example, when considering the simulation of effects obtained using a brush, splatter and dripping effects can be simulated. Such effects can be triggered in response to accelerations above a predetermined threshold, for example by monitoring the angular change in the direction of the velocity vectors between successive sampling intervals or by monitoring angular acceleration in three dimensions.

The derivatives could be determined directly for example using an accelerometer in the case of acceleration but usually the derivatives will be calculated when the system is implemented in a suitably programmed computer.

In accordance with a second aspect of the present invention, a graphics system comprises an input device, means for detecting changes in the position of the input device relative to a surface, means for displaying patterns which follow the movement of the input device, and storage means for storing data defining the form of a simulated surface on which the patterns are being drawn, wherein the means for displaying patterns is responsive to movement of the input device and the stored data to simulate the effect of the underlying, simulated surface on the pattern being drawn.

This aspect of the invention, which is particularly useful in combination with the first aspect of the invention allows real effects to be simulated electronically such as the slope of a surface on which the pattern is being drawn. Thus, the data stored by the storage means can define the effect of gravity on the coloured medium which is being modelled while another effect which can be modelled is the effect of the thickness of the previously laid down medium such as simulated ink on a subsequent pass of the input device.

BRIEF DESCRIPTION OF THE DRAWINGS

Embodiments of a computer graphics system according to the present invention will now be described, by way of example, with reference to the accompanying drawings, in which:

FIG. 8 is a flow diagram illustrating one example of the mode of operation of the system; and, FIG. 9 illustrates the appearance of a "drip" generated by the system when operated in accordance with the FIG. 8 flow diagram.

DETAILED DESCRIPTION OF THE EMBODIMENTS

Figure 1:
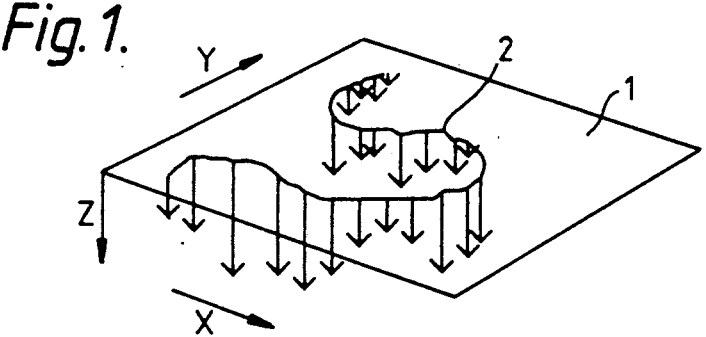
FIG. 1 is a representation of a three-dimensional scalar and vector field derivable from a pressure sensitive input device.

Referring to FIG. 1, the illustration schematically represents the movement of a pressure sensitive input device or pen (not shown) of conventional form over a square tablet 1, the pen following the line 2. In known manner, the position in terms of X and Y coordinates relative to the tablet of the pen tip is output from the tablet, and the pressure on the pen tip is output from the pen and can be considered as representing a third dimension Z.

Thus the system provides X, Y and Z coordinates which are conventionally used to trace a line on a screen of a monitor (not shown) corresponding in shape to the shape of the line 2 and having a width related to pen tip pressure. Alternative systems to the pen and tablet system described produce two and three-dimensional information in a similar manner to produce similar screen effects.

In a conventional system, the frame store defining pixels on a one to one basis with the monitor screen is continually updated with the information from the tablet and thereafter controls the monitor display in a conventional manner.

With the known arrangements, the screen effects produced are intended to be independent of the speed at which the input device moves and its acceleration. If the system response time is relatively slow some speed-related effects may become apparent, simply because the system cannot "keep up with" the input device movement. Such effects are however not intended.

In accordance with one aspect of the present invention, at least one differential derivative with respect to time is calculated by the system and used to adjust the image resulting from movement of the input device. This can be done in a number of ways as described below.

Figure 2:
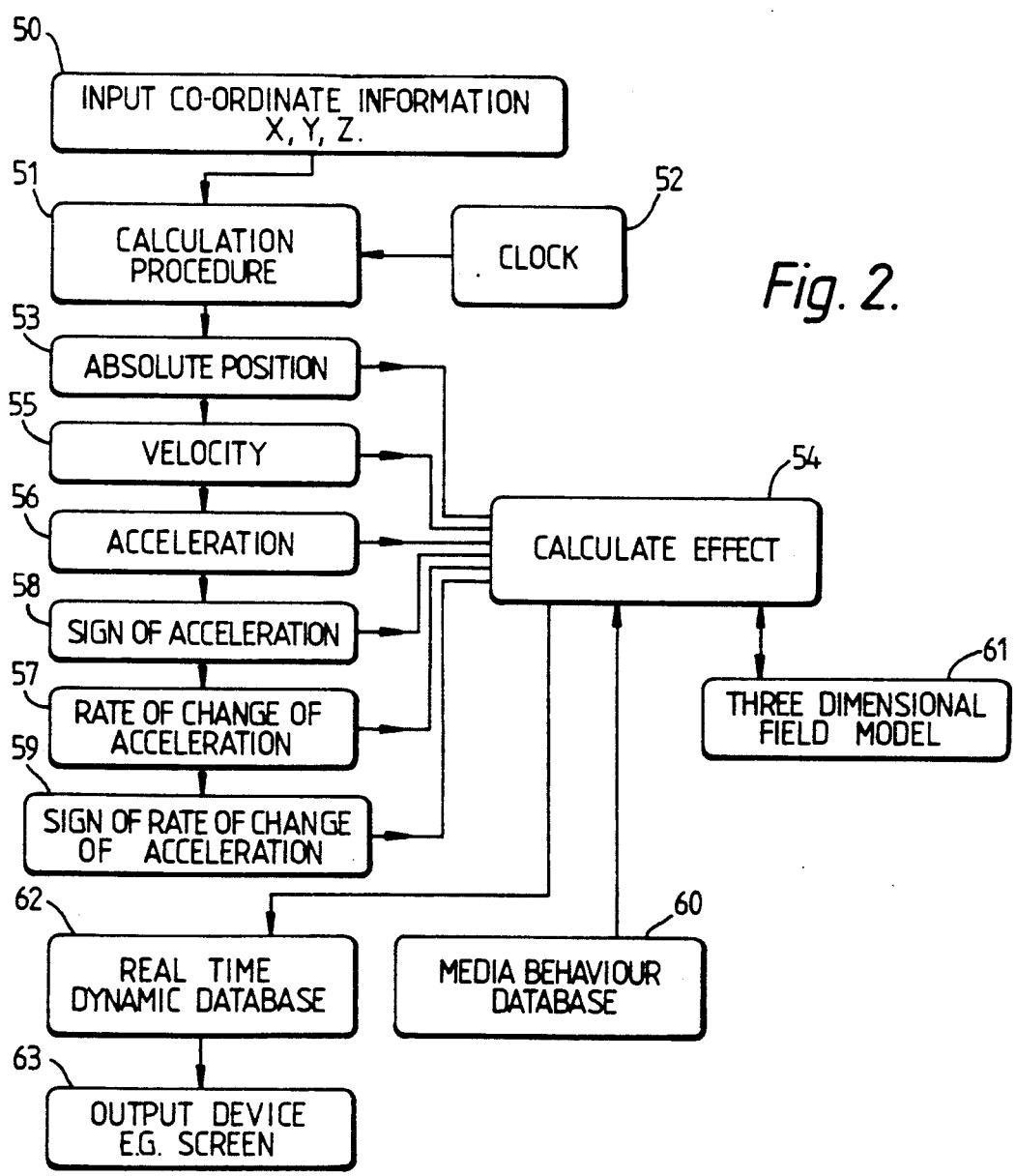
FIG. 2 is a flow chart illustrating the mode of operation of an embodiment of the present invention.

Referring to FIG. 2, a flow chart is shown illustrating the operation of one embodiment of the invention. Input coordinate information 50 in three dimensions corresponding to the movement of an input device such as a simulated paint brush is processed in accordance with a predetermined calculation procedure 51 which is controlled by a timing signal from a clock 52. The timing signal determines the period between successive evaluations of X, Y and Z (sampling intervals) and the calculation procedure 51 derives the first, second and third derivatives with respect to time of X, Y and Z.

The absolute position (X,Y,Z) 53 in 3D space (or the absolute position (X,Y) in 2D space together with a pressure value (Z)) is provided to a calculation routine 54, as is the velocity 55 (the vector sum of the first derivatives), the acceleration 56 (the vector sum of the second derivatives), and the rate of change of acceleration 57 (the vector sum of the third derivatives). The sign of the acceleration 58 and of the rate of change of acceleration 59 are also provided. This enables the effect of the "brush" on the "sheet" to be modelled. This modelling may be achieved independently of any previous patterns which have been applied to the sheet or can take account of the previous patterns stored in a three-dimensional field model 61. If this model is used then the model is updated following each calculation 54. The use of the model will be explained in more detail below with reference to FIGS. 3 and 7.

The media to be emulated, e.g. soft brush and paint, pen and ink etc, is modelled in a media behaviour database 60 which defines various fixed parameters such as brush shape. The field and media databases provide data to enable the effect of moving the brush to be determined and recorded in a real time dynamic database 62 (the frame store) to generate appropriate image data for display on an output device 63 such as the screen of a monitor.

The various elements shown in FIG. 2 will normally be implemented on a suitably programmed computer with attached stores although hard wired circuits could also be used.

Figure 3:
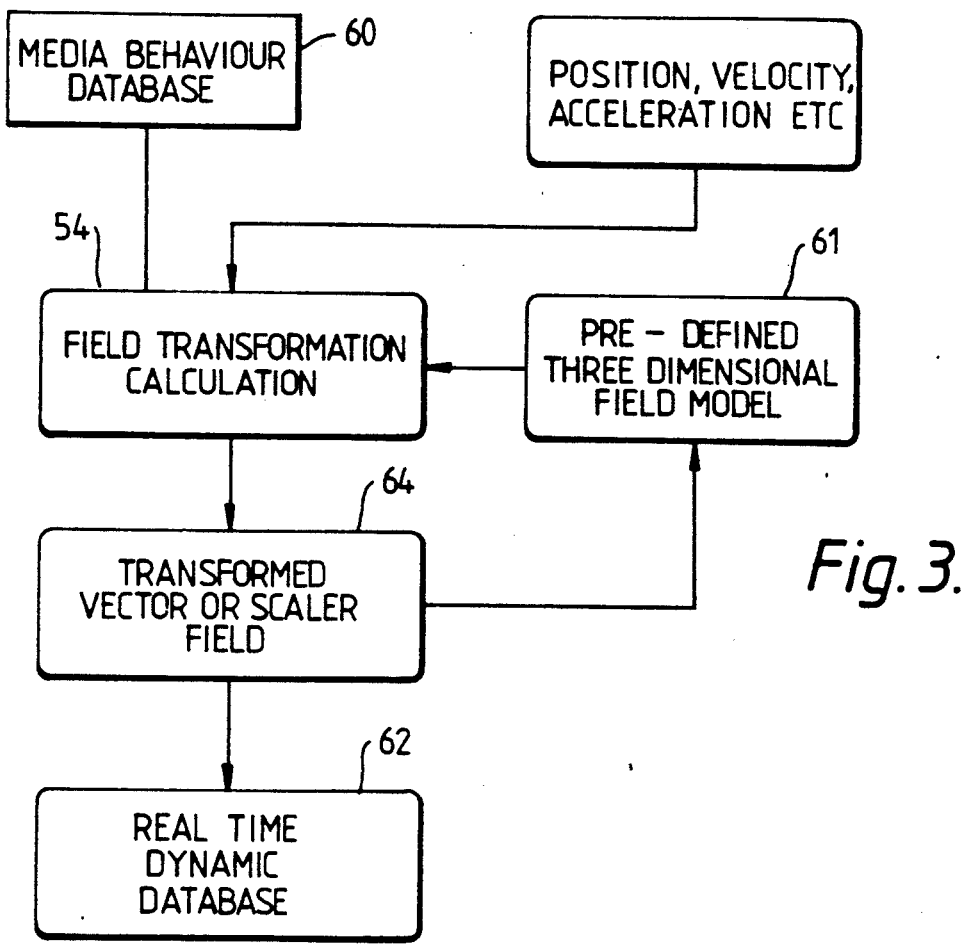
FIG. 3 is a flow chart illustrating field modelling in the embodiment of FIG. 2.

FIG. 3 illustrates the operation of the calculation routine 54 which enables the field model 61 to incorporate the results of previous inputs into a basic field model. For example, a pre-defined three-dimensional field model 61 can be established and stored corresponding to a flat sheet of paper inclined to the vertical at a predetermined angle corresponding to the position adopted by an artists easel. Information relating to the position, velocity etc. of the input device is submitted to the field transformation calculation routine 54 which takes into account the pre-defined three-dimensional field model 61 and the media behaviour database 60 to produce desired effects, e.g. paint slippage in the direction of the bottom edge of the simulated paper, and provides transformed vector and scalar outputs 64 accordingly. In the illustrated embodiment, the transformed outputs are fed back to the field model 61 to update the predefined model, thereby enabling subsequent inputs to be affected by earlier inputs. For example, thick horizontal layers of paint could affect the slippage of overlying vertical layers of paint, and this can be taken into account in the updated field model. It is not necessary however for the field model to be updated by a feedback input in this way.

Figure 4:
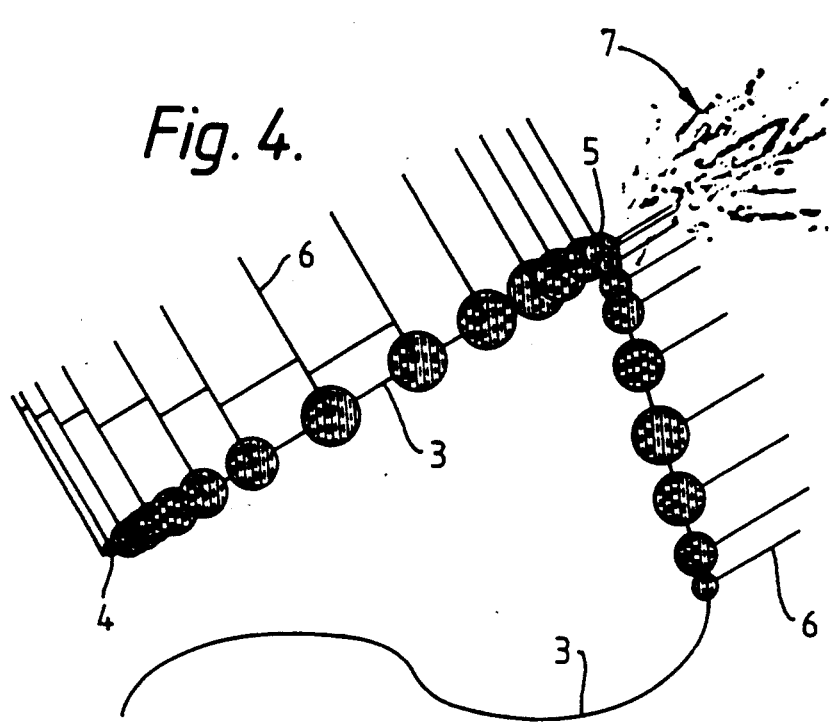
FIG. 4 illustrates data derivable from the embodiment of FIG. 2 to serve as the basis for generating predetermined effects.

Referring now to FIG. 4, one example of a graphic effect which can be achieved in accordance with the invention is illustrated. An input device is caused to follow the path indicated by the heavy line 3. The movement is initially straight from point 4 to point 5, and then there is an abrupt change in direction after which the input device initially follows a straight line but then follows an arcuate path. The lines 6 indicate the position of the input device at successive timing intervals (each timing interval may correspond to a predetermined number of position sampling intervals). Thus the spacing between adjacent lines 6 along the path increases with speed and the change in the spacing and the relative inclinations between adjacent lines 6 is a measure of acceleration. In the example of FIG. 4, the system has been set up to "paint" circular shapes the size of which increases with velocity. This is equivalent to the sort of effects one can achieve with a heavily loaded dripping brush or fountain pen. (Depending on the effect desired, the width/velocity relationship could be reversed so that the resultant pattern is thinner as the velocity increases. The relationship does not have to be directly proportional). The system is also set up to simulate splash effects such as occurs when a heavily loaded brush is rapidly decelerated, e.g. at point 5. The input device was decelerated as it approached point 5 from point 4, and thus the splash effect 7 is in line with the initial direction of movement of the input device. The splash effect is triggered if the calculated acceleration exceeds a preset threshold determined by the media behaviour database 60.

Figure 5:
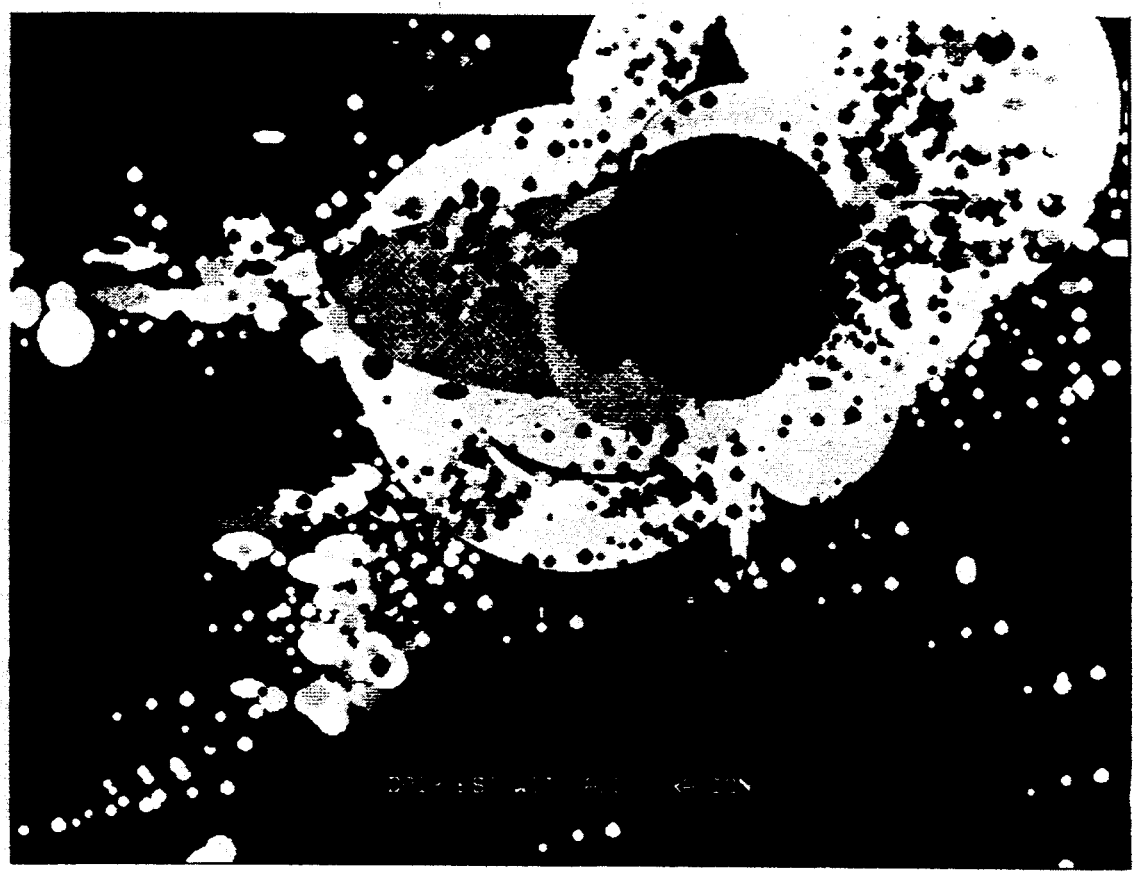
FIG. 5 illustrates effects which can be generated using the embodiment of FIG. 2.

FIG. 5 illustrates the results achieved with a system operating as described above with reference to FIG. 4. It will be seen that the splash effect is represented as three "drips" (as shown at 65) positioned in a line orthogonal to the acceleration direction.

Figure 6:
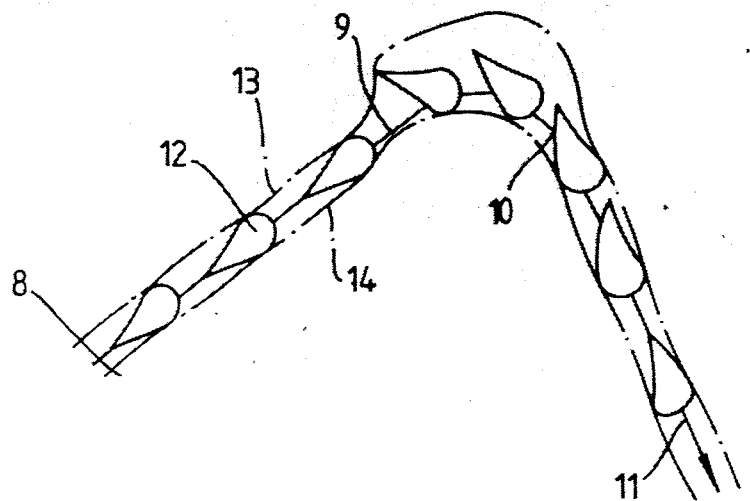
FIG. 6 illustrates the generation of inertial effects using the embodiment of FIG. 2.

FIG. 6 illustrates how extra effects can be achieved. A loaded soft brush which is rapidly accelerated exhibits inertial effects as the shape of the brush changes with acceleration. The effect of velocity, acceleration and/or pressure on flexure of bristles of the brush can be modelled in the media database. In FIG. 6, an input device is assumed to have moved along a straight line path from point 8 to point 9, along a curved path from point 9 to point 10, and then along a straight line path from point 10 to point 11. Shapes 12 made up from circular leading sectors and triangular trailing sections are "painted" at intervals the spacing between which is speed dependent. The speed is thus roughly constant but the velocity changes. As the input device accelerates to move around the curve from point 9 to point 10, the trailing end of the shape 12 swings out away from the line 9, 10, the degree to which the shape swings out being a function of acceleration perpendicular to the velocity vector and possibly also the pressure applied to the input device. Thus the inertial effects of a heavily loaded soft brush can be simulated. The pattern displayed can be a string of shapes 12, or the envelope indicated by lines 13 and 14 swept out by the shapes 12 can be filled in.

Another example of effects which can be achieved will now be described with reference to FIGS. 8 and 9. In this example, an elliptical brush is simulated and the splash effect due to acceleration modelled. Initially, in a step 70 the media behaviour database 60 is loaded with fixed parameters including proportionality constants D1 and k and thresholds D2 and VC. In operation, the calculation procedure 51 (FIG. 2) is initiated and this starts by determining the current coordinates IX IY from the tablet over which the pen is moved and also determines the pen status (step 71). These coordinates are sampled at successive, equally spaced time intervals determined by the clock 52. The previous X coordinate (OLDIX) is obtained from a register in a step 72 and then the difference between the two X coordinates per unit time is determined (step 73) to obtain the X velocity (ACX). Similarly, the previous Y coordinate (OLDIY) is obtained from a register (Step 74), and the difference in Y coordinates per unit time is determined so as to define the Y velocity (ACY) in a step 75. The signs of ACX and ACY are examined and if these are each positive and both ACX and ACY exceed the threshold VC (step 76) then a colour index is incremented by one. The colour index is stored in the media database 70 and defines a series of different colours which may graduate in terms of brightness from a comparatively dark colour to a very bright colour with increasing colour index value or can be a completely artificial set of colours. The effect of this procedure is that the faster the pen is moved, the brighter the colour becomes.

In a step 77 it is determined whether the signs of the velocities ACX and ACY are both negative but yet both ACX and ACY exceed the threshold VC in which case the colour index is decreased by one.

A velocity register is updated at each sampling interval with the current velocity so that in a step 78 the previous X velocity is read from the register and the difference between the previous X velocity and the current X velocity per unit time is determined so as to define an acceleration variable ACACX (step 79) which is stored. In a similar manner the previous Y velocity is read from a register (step 80) and the difference between the present Y velocity and the previous Y velocity per unit time is determined in order to define the Y acceleration variable ACACY (step 81).

If the pen state is non-zero (step 82) indicating that the splash effect is desired, then in a step 83 it is determined whether the X acceleration exceeds a threshold D2 and if it does the position of secondary drips in the X direction is determined. This distance is determined to be proportional to the X velocity, the proportionality constant being the value k previously stored.

In a similar manner, in a step 84, the Y acceleration is compared with the threshold D2 and the displacement of secondary drips in the Y direction is determined.

Following step 84, or where appropriate step 82, a step 85 is performed in which the size of the main spot or primary drip from the brush is determined. This size can vary dynamically depending on the values of the X and Y velocities and is defined as an ellipse with major axes in the X and Y directions of D1 ACX and D1 ACY respectively (FIG. 9).

In a step 86 the coordinates of the centre of the primary and secondary drips are determined and the realtime dynamic database updated accordingly so that pixels corresponding to the primary and secondary drips are loaded with a suitable time delay with data defining the drips in terms of colour densities with the result that the primary and secondary drips are then successively displayed (step 87) on the monitor 63.

Finally, the various registers recording X, Y coordinates velocities and accelerations are updated (step 88) and processing returns (step 89) to step 71.

Figure 9:
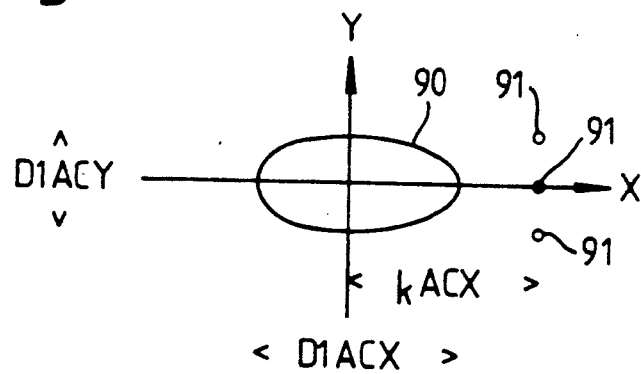

FIG. 9 illustrates a typical form for a primary drip 90 and a set of three secondary drips 91. The dimensions of the primary drip 90 are defined in FIG. 9 and the displacement of the secondary drips 91 from the Y axis is also defined. In this case, it will have been found in step 83 that the acceleration variable in the X direction exceeds D2 but that the acceleration variable in the Y direction does not exceed D2. Consequently, the secondary drips 91 are not displaced in the Y direction.

It will also be apparent from FIG. 9 that different effects can be achieved by changing the size of the proportionality constants and by using different proportionality constants for defining the size of the primary drip 90 in the X and Y directions.

Figure 7A:
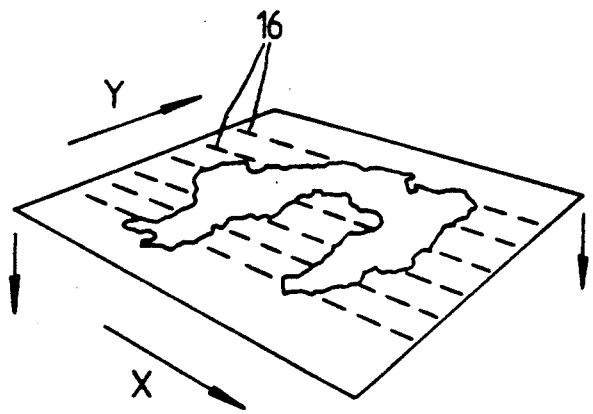
FIG. 7 illustrates three-dimensional modelling to give a three-dimensional field database.
Figure 7B:
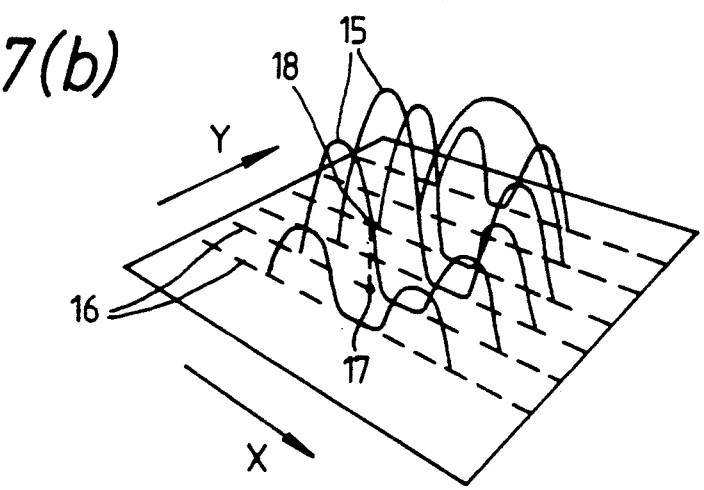

Referring now to FIG. 7, this illustrates effects which can be achieved by the interactive modelling techniques described with reference to FIG. 3. If we imagine that we start with a horizontal sheet in the plane defined by X and Y (the predefined three-dimensional field model), each operation of the input device will add to that model and layers of material can be built up to define a three-dimensional surface. Such a surface is indicated in FIG. 7 by lines 15 which lie in respective planes that cut the horizontal surface along lines 16 parallel to the X axis. The lines 15 exaggerate the thickness of the built-up layers. Each part of this surface can be assigned a surface texture dependent upon the inputs which led to its formation, the texture defining "slippiness", that is the tendency of the next applied layer to slide over the surface. When the input device is placed on a point 17 which corresponds to the point 18 on the built up surface the angle of inclination to the horizontal of the surface at point 18 can be calculated and the resultant image can be adjusted as if the material deposited on point 18 slides down the built up surface in a manner consistent with the surface inclination and texture. Thus effects analogous to the behaviour of flowing materials such as paint can be simulated. The viscosity of the flowing material would of course be modelled in the media database. This can be important where relatively large amounts of "paint" are to be introduced as a result of drop and splash effects related to the velocity and acceleration of the input device.

Further effects to those described can be achieved, for example textures dependent upon velocity, colours which are dependent on velocity, and the like. The effects do not necessarily have to emulate effects found with traditional media.

I claim:

1. A graphics system comprising an input device, means for detecting changes in the position of the input device relative to a surface, and means for generating and displaying patterns which follow the movement of the input device, wherein means are provided for determining at least one differential derivative with respect to time of a displacement vector of the input device, and means are provided for controlling characteristics of the displayed patterns as they are generated in dependence upon the or each determined derivative so as to simulate the effect of painting on a surface.

2. A system according to claim 1, wherein the components defining the input device position comprise first and second components defining the displacement of the input device and a third component defining the pressure with which the device is applied to the surface or the displacement of the device away from the surface.

3. A system according to claim 1, wherein the means for determining at least one differential derivative with respect to time is adapted to calculate the derivative of one or more of the components defining the input device position.

4. A system according to claim 1, wherein the determined derivatives control one or more of the shape, width, density, texture and colour of the displayed patterns.

5. A system according to claim 1, wherein the acceleration of the input device relative to the surface is determined, the means for controlling characteristics of the display pattern determining whether the acceleration exceeds a threshold and, if it does, causing a splash effect to be displayed.

6. A graphics system comprising an input device, means for detecting changes in the position of the input device relative to a surface, means for displaying patterns which follow the movement of the input device, and storage means for storing data defining the profile of a simulated surface on which the patterns are being drawn, wherein the means for displaying patterns is responsive to movement of the input device and the stored data to simulate the effect of said simulated surface profile by modifying the pattern being drawn after passage of the input device.

7. A system according to claim 6, wherein the stored data simulates the thickness of a simulated colour medium laid down previously.

8. A graphics system comprising an input device, means for detecting changes in the position of the input device relative to a surface, and means for displaying patterns which follow the movement of the input device, wherein means are provided for determining at least one differential derivative with respect to time of the displacement vector of the input device, and means are provided for controlling characteristics of the displayed patterns in dependence upon the or each determined derivative, and storage means for storing data defining the form of a simulated surface on which the patterns are being drawn, wherein the means for displaying patterns is responsive to movement of the input device and the stored data to simulate the effect of an underlying surface by modifying the pattern being drawn after passage of the input device.

9. A system according to claim 6, wherein said stored data simulates the slope of the underlying surface.

* * * * *

UNITED STATES PATENT AND TRADEMARK OFFICE
CERTIFICATE OF CORRECTION

PATENT NO.   : 5,239,292
DATED        : Aug. 24, 1993
INVENTOR(S)  : Stephen B. WILLAN It is certified that error(s) appears in the above-identified patent and that said Letters Patent is hereby corrected as shown below:

Title page, delete "[73] Assignee: Crosfield Electronics, Ltd., England".

Signed and Sealed this

Twenty-first Day of January, 1997

Attest:

BRUCE LEHMAN

*Attesting Officer*   *Commissioner of Patents and Trademarks*